Feb. 21, 1967 D. H. GROSSMAN ET AL 3,305,732

SPURIOUS SIGNAL VOID CIRCUIT

Filed June 10, 1963

INVENTORS
DAVID H. GROSSMAN
MONTY M. MERLEN

BY Joseph Levinson

ATTORNEY 3,305,732

SPURIOUS SIGNAL VOID CIRCUIT

David H. Grossman and Monty M. Merlen, Stamford, Conn., assignors to Barnes Engineering Company, Stamford, Conn., a corporation of Delaware Filed June 10, 1963, Ser. No. 286,669
3 Claims. (Cl. 307—88.5)

This invention relates to a spurious signal void circuit and more particularly to a circuit of this character which is pulse sensitive, remaining inactive when the proper frequency is applied thereto, and being activated for performing an inhibiting functon when an undesired frequency of pulses is applied thereto.

In a wide variety of electronic applications, the electronic equipment depends on the receipt of specific signal information. The failure to receive such information, which may be due to noise in the signal information received or faulty operation of the equipment itself, provides an undesirable result. Accordingly, it is generally desirable to inhibit or inactivate the equipment until satisfactory signals again appear. In order that the inhibit circuitry operate properly, it is desirable that it be quick acting, both on eliminating undesirable signals and in reestablishing the equipment for receipt of the desired signals.

It is an object of this invention to provide a new and improved spurious signal void circuit.

A further object of this invention is to provide a new and improved spurious signal void circuit which acts rapidly both on inhibiting the signal channel and on reestablishing it as soon as satisfactory signals again appear.

Still another object of this invention is to provide a new and improved spurious signal void circuit which is simple, rugged, and reliable.

In carrying out this invention in one illustrative embodiment thereof, a frequency discriminator means is provided for producing a varying voltage between certain set levels for a given desired frequency signal. For a signal of decreasing or zero frequency, a decreasing voltage is produced, which is less than the lower of the set levels produced by a desired frequency signal, and, when a higher frequency signal is applied to the discriminator, an increasing voltage builds up above the upper level of the voltage produced by the desired frequency signal. The output voltage of the frequency discriminator is applied to a single transistor over-under voltage comparator means, which controls an inhibit relay means. As long as the desired frequency signal is being received by the frequency discriminator means, the single transistor over-under voltage comparator means does not actuate the inhibit relay means. However, when a zero frequency, increased frequency or decreased frequency signal is received, the comparator means actuates the inhibit relay means which will maintain the equipment in which the spurious signal void circuit is operating inactive until satisfactory signals again appear.

Figure 1:
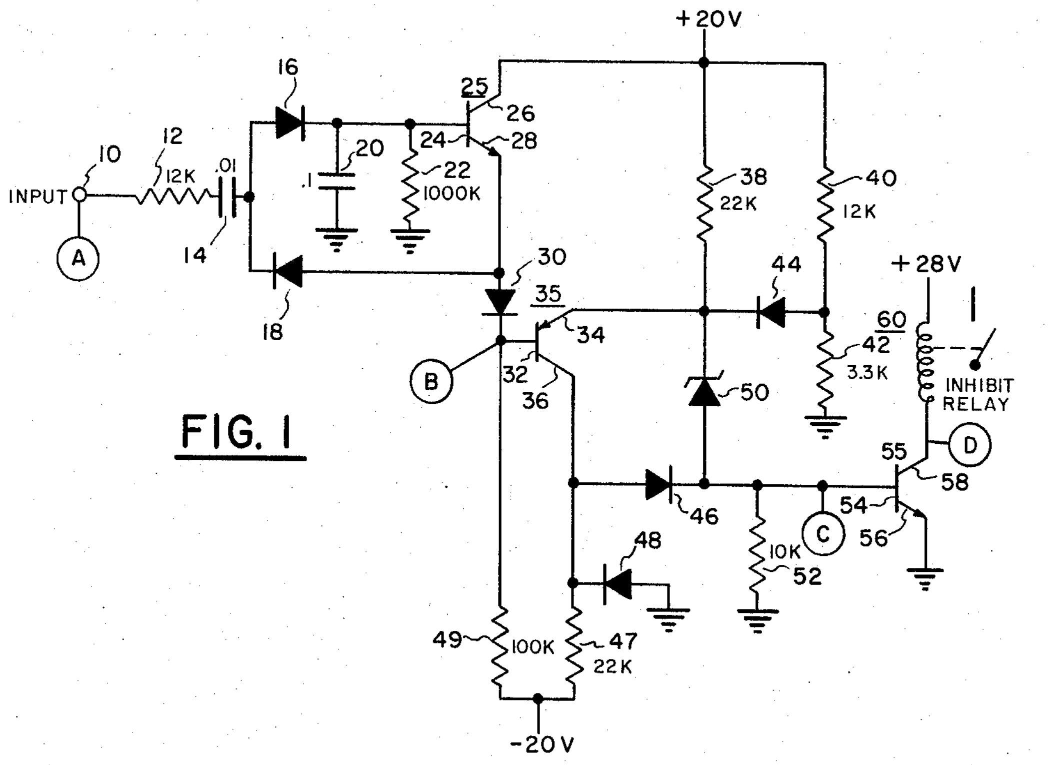
Figure 2:
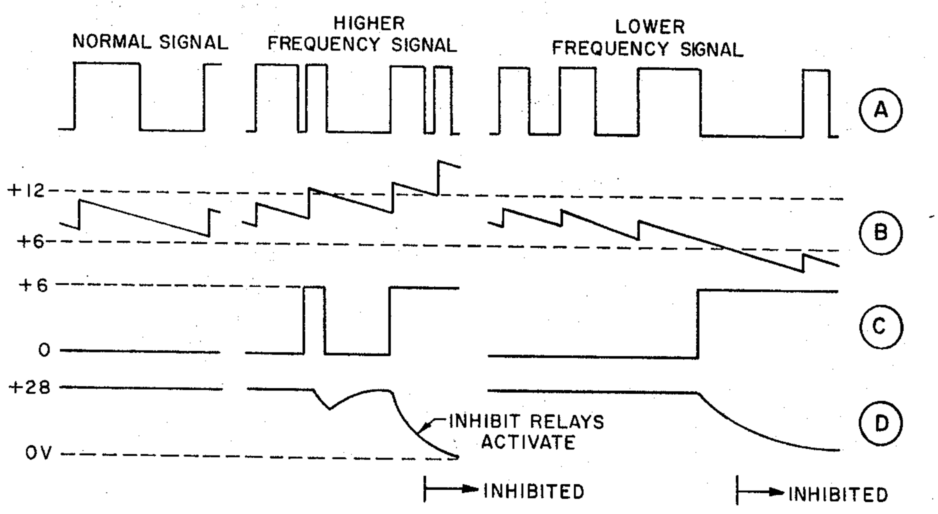

The invention, both as to organization and method of operation, together with further objects and advantages thereof, may best be understood by reference to the following description taken in connection with the accompanying drawings, in which:

FIG. 1 is an electrical schematic diagram of the spurious signal void circuit embodied in this invention, and FIG. 2 shows a plurality of wave forms illustrating the operation of FIG. 1 under normal conditions in which a desired frequency is received and under conditions when the frequency is increased or the frequency is lowered.

Referring now to FIG. 1, an input signal is applied to an input terminal 10 and coupled through a network including a resistor 12, a coupling capacitor 14, a unilateral conducting device 16, a capacitor 20, a resistor 22 to a base electrode 24 of a transistor 25. The transistor 25 has a collector electrode 26 connected to a source of positive potential and an emitter electrode 28. A unilateral conducting device 18 poled oppositely to that of unilateral conducting device 16 is connected between the emitter electrode 28 and the unilateral conducting device 16. This portion of the circuit is a frequency discriminator means which functions to produce a voltage which increases steadily with frequency to a predetermined maximum. This voltage is developed on capacitor 20 and appears at the output of transistor 25, the emitter electrode 28. For a given desired frequency an output signal from the transistor 25 appearing at the emitter electrode 28 produces a positive voltage which varies between predetermined limits in accordance with the circuit design.

The voltage from the emitter electrode 28 of the frequency discriminator is applied via a unilateral conducting device 30 to an over-under voltage comparator circuit which includes a single transistor 35 having a base electrode 32 to which device 30 is connected, an emitter electrode 34, and a collector electrode 36. The base electrode 32 is connected through a biasing resistor 49 to a source of negative potential. The emitter electrode 34 is provided with a high impedance path via a resistor 38 to a source of positive potential. A low impedance path is also provided for the emitter electrode 34 via a unilateral conducting device 44 which is connected to the junction of a voltage divider comprised of resistors 40 and 42 which are serially connected between a source of positive potential and ground. The collector electrode 36 of the transistor 35 is connected through a biasing resistor 47 to a source of negative potential. A unilateral conducting device 48 is connected between the collector electrode 36 and ground for protecting transistor 35.

The output of the over-under comparator circuit is applied to an inhibit circuit. A unilateral conducting device 46 applies the output of the collector electrode 36 to a base electrode 54 of a transistor 55 when the unilateral conducting device 46 is biased into conduction. The base electrode 54 is connected to ground through a biasing resistor 52. Emitter electrode 56 or transistor 55 is connected to ground, and a collector electrode 58 is connected through inhibit relay means 60 to a source of positive potential. The relay means 60 may include a plurality of coils and associated contacts if desired. A Zener diode 50 is connected between the emitter electrode 34 of the transistor 35 and the base electrode 54 of transistor 55, which causes conduction of transistor 55 when the Zener breakdown voltage is reached.

As an aid in the explanation of the operation of FIG. 1, the wave forms of FIG. 2 will be utilized. These waveforms are derived utilizing the circuit parameters which have been indicated on the circuit diagram in which all resistors are kilo-ohms and all capacitors are microfarads. These parameters are merely illustrative of an operative embodiment in which the circuit has been adjusted so that a 30 c.p.s. signal produces a constant varying voltage which does not inhibit the equipment by actuation of the inhibit relay means 60. The invention is not considered limited to this particular application.

In operation, when a normal signal is received, which is a rectangular wave appearing at point A or the input terminal 10, a varying voltage appears on capacitor 20, which appears on the base electrode 32 of transistor 35. This wave shape is shown at point B. The voltage on the base of transistor 35 biases transistor 35 into low current conduction, which is its normal operating state when receiving the desired wave of specified frequency. The low current conduction caused by normal operation of the transistor 35 does not raise the collector potential appearing on the collector electrode 36 sufficiently to drive the unilateral conducting device 46 into conduction. Accordingly, no current appears at point C, the base of transistor 54, and the full voltage supply appears at point D at the collector electrode 58 of transistor 55, which indicates that the transistor 55 is non-conductive.

For an increasing frequency signal, the voltage appearing on capacitor 20 does not have sufficient time to discharge, and it builds up to a sufficiently positive level so that the voltage at the emitter electrode 34 of transistor 35 exceeds the breakdown voltage level of Zener diode 50, and it begins conducting. At this point, the transistor 35 stops conducting. It will be noted from the curves in FIG. 2 that as soon as the voltage at point B exceeds the breakdown level of the Zener diode 50 it begins conducting. However, the first pulse produced due to this conduction is not sufficient to activate the inhibit relay means 60. However, as the voltage builds up, the Zener diode 50 conducts for a sufficient time, causing the conduction of transistor 55 to supply current to the inhibit relay means 60 to cause it to actuate.

If the frequency of the input becomes lower, the voltage on the base of transistor 35 becomes progressively lower, so that the transistor 35 is driven very strongly conductive through the low impedance path in the emitter circuit 34 provided by the resistor 40 and the unilateral conducting device 44. Unilateral conducting device 44 starts conducting when the potential on the base of transistor 35 is reduced below the level of the voltage on the unilateral conducting device provided by the voltage divider consisting of resistors 40 and 42 by an amount equal to the conduction drops of transistor 35 and unilateral conducting device 44. The very heavy conduction of transistor 35 biases the unilateral conducting device 46 into conduction, to place a current in the base 54 of the transistor 55, causing it to conduct, which supplies current to the inhibit relay means 60 for actuating this means. The voltage at the collector electrode 58 of transistor 55 can also serve as an over or under indicator. For some applications the indication may be all that is needed, or it might be desirable to know whether the signal is over or under.

The inhibit relay means 60 may include a single or a plurality of contacts, or a plurality of coils and contacts which are operated by the transistor 55, with the contacts being placed in suitable circuits in the equipment to which the spurious signal void circuit is utilized. The operation of the inhibit relay means would then disconnect the equipment processing circuitry until the desired signal is again received.

The spurious signal void circuit as embodied in this invention may be utilized where a rectangular wave input signal is desired for providing specific control functions. One important application for such a circuit, and the one application which the circuit parameters have been designed for, is in horizon sensors. Horizon sensors are used to control the attitude of vehicles in which they are installed. Horizon sensors scan over a wide area which intersects the earth at two points, thereby producing a signal having a rectangular shape in which the leading and trailing edges of the rectangular wave shape correspond to the points where the sensor's scan crosses the horizon. The pulse width and pulse amplitude of these signals are used to adjust the attitude of the vehicle carrying the sensor. The received signal is compared to a reference signal to derive an error signal which is utilized to make corrections. Faulty operation may occur if the received signal pulse width is changed, due to clouds or other interference, or if the scan cycle is slowed down for some reason. If the reference signal is then compared with the signal produced by the horizon sensor from the scan, errors will result which should be eliminated. By placing the inhibit relay in the error signal channel before it has time to work improperly, the spurious signal void circuit of this invention prevents the error signal from performing on incorrect signals. Then, as soon as satisfactory signals are received again, the error signals are then again reconnected to the controlled apparatus.

One of the advantages of the present invention is that an over-under comparator is provided which uses a single transistor for handling three voltage levels, such that if a proper frequency signal is not received, the inhibit circuit is actuated. The present invention provides a relatively simple, yet rugged and reliable, means for providing the inhibit function.

The invention has application not only to horizon sensors, but to other circuits which use rectangular pulses for control purposes. If it is desired to inhibit spurious or noise signals to prevent faulty operation of the equipment controlled by such signals, the spurious signal void circuit of this application may be utilized. For example, radar or telemetering systems using rectangular inputs may find need for such a circuit.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What we claim as new and desire to secure by Letters Patent is:

1. A spurious signal void circuit which remains inactivated when a desired frequency signal of a given duration is received and is activated when no signals are received or when other than the desired signals are received, comprising (a) a frequency discriminator for producing a voltage in accordance with an applied received signal,
(b) a transistor having base, collector, and emitter electrodes,
(c) means for applying the voltage from said frequency discriminator means to said base electrode,
(d) a low impedance path connected between a source of potential and said emitter electrode,
(e) a high impedance path connected between said source of potential and said emitter electrode,
(f) inhibit relay means coupled to said collector electrode and responsive to the output thereof,
(g) a Zener diode connected between said emitter electrode and said inhibit relay means,
(h) means for biasing said transistor such that said transistor conducts through said low impedance path when a voltage applied thereto is below a predetermined level and said transistor conducts through said high impedance path between said predetermined level and a higher predetermined level and said transistor stops conducting and said Zener diode conducts above said higher predetermined level.

2. An over-under comparator circuit for providing an output control voltage when the voltage applied thereto exceeds a first predetermined level or drops below a second predetermined level while providing no control voltage between said first and second predetermined levels, comprising (a) a transistor having base, collector, and emitter electrodes,
(b) means for applying an input voltage to the base of said transistor,
(c) a low impedance path connected between a source of potential and said emitter electrode,
(d) a high impedance path connected between said source of potential and said emitter electrode,
(e) a unilateral conducting device connected between said collector and an output terminal, (f) a Zener diode connected between said emitter electrode and said output terminal, (g) means for biasing said transistor such that said transistor conducts heavily through said low impedance path when the voltage applied to said base electrode is below said second predetermined level, said transistor conducts moderately through said high impedance path between said first and second predetermined levels and said transistor stops conducting and said Zener diode conducts above said first predetermined level.

3. An inhibit circuit comprising (a) a frequency discriminator means having an input and an output, (b) means for applying signals to said input, (c) a transistor having base, collector, and emitter electrodes, (d) means for applying the output of said frequency discriminator means to said base electrode, (e) a first source of potential, (f) a resistor connected between said source of potential and said emitter electrode, (g) a voltage divider and a first unilateral conducting device connected between said source of potential and said emitter electrode, (h) biasing means connected to said base and emitter electrodes, (i) inhibit relay means, (j) a second unilateral conducting device connected between said collector electrode and said inhibit relay means, and (k) a Zener diode connected between said emitter electrode and said inhibit relay means.

References Cited by the Examiner

UNITED STATES PATENTS

| | | | |
|---|---|---|---|
| 3,131,258 | 4/1964 | O'Neill | 307—88.5 |
| 3,187,202 | 6/1965 | Case | 307—88.5 |
| 3,196,283 | 7/1965 | Flattau | 307—88.5 |
| 3,205,448 | 9/1965 | Bahrs et al. | 307—88.5 |
| 3,207,959 | 9/1965 | Miller | 307—88.5 |
| 3,221,249 | 11/1965 | Shearer et al. | 307—88.5 |
| 3,243,604 | 3/1966 | Johnson | 307—88.5 |

ARTHUR GAUSS, *Primary Examiner.*

R. H. EPSTEIN, *Assistant Examiner.*